Patented Sept. 2, 1947

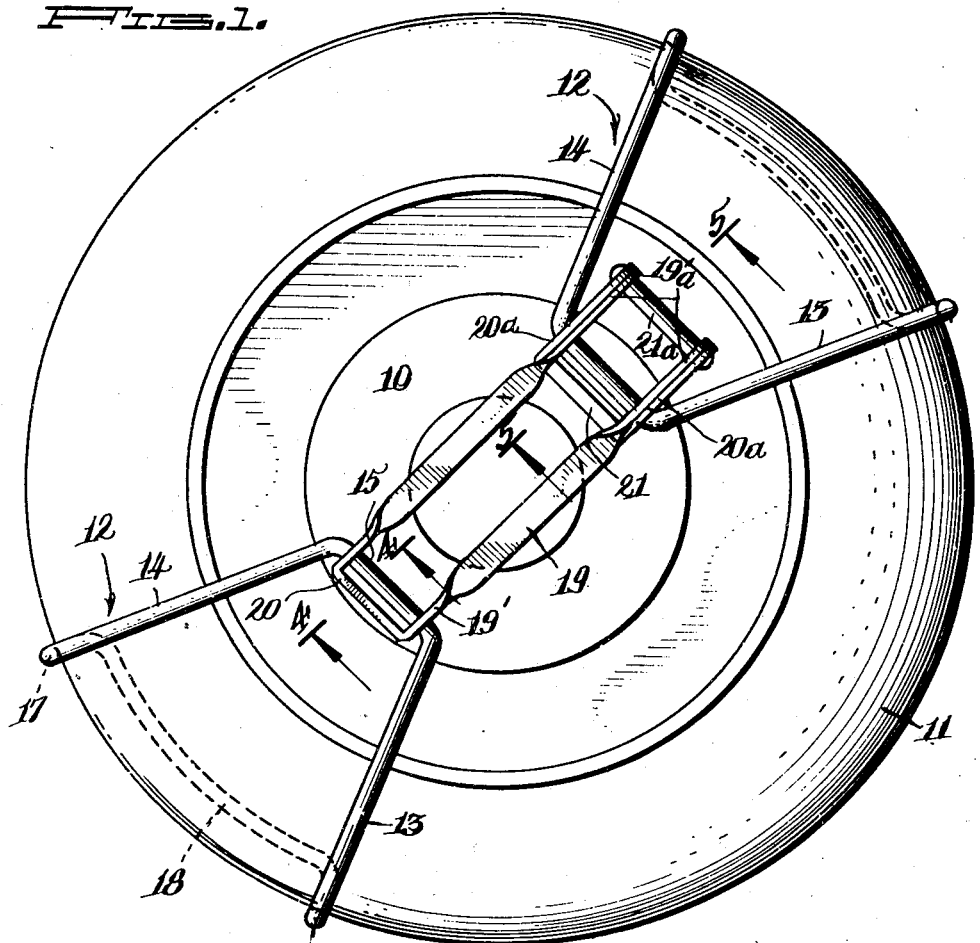
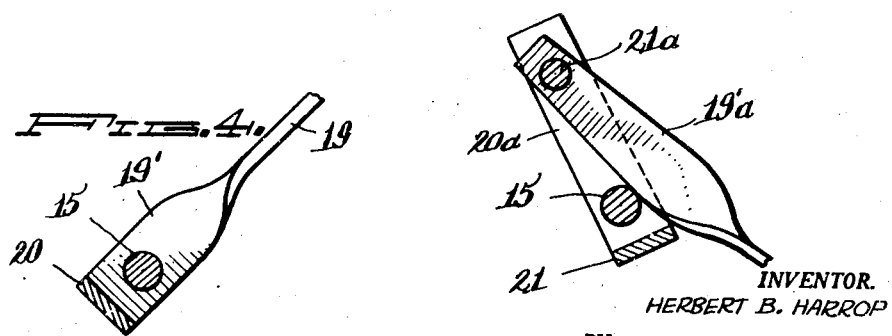

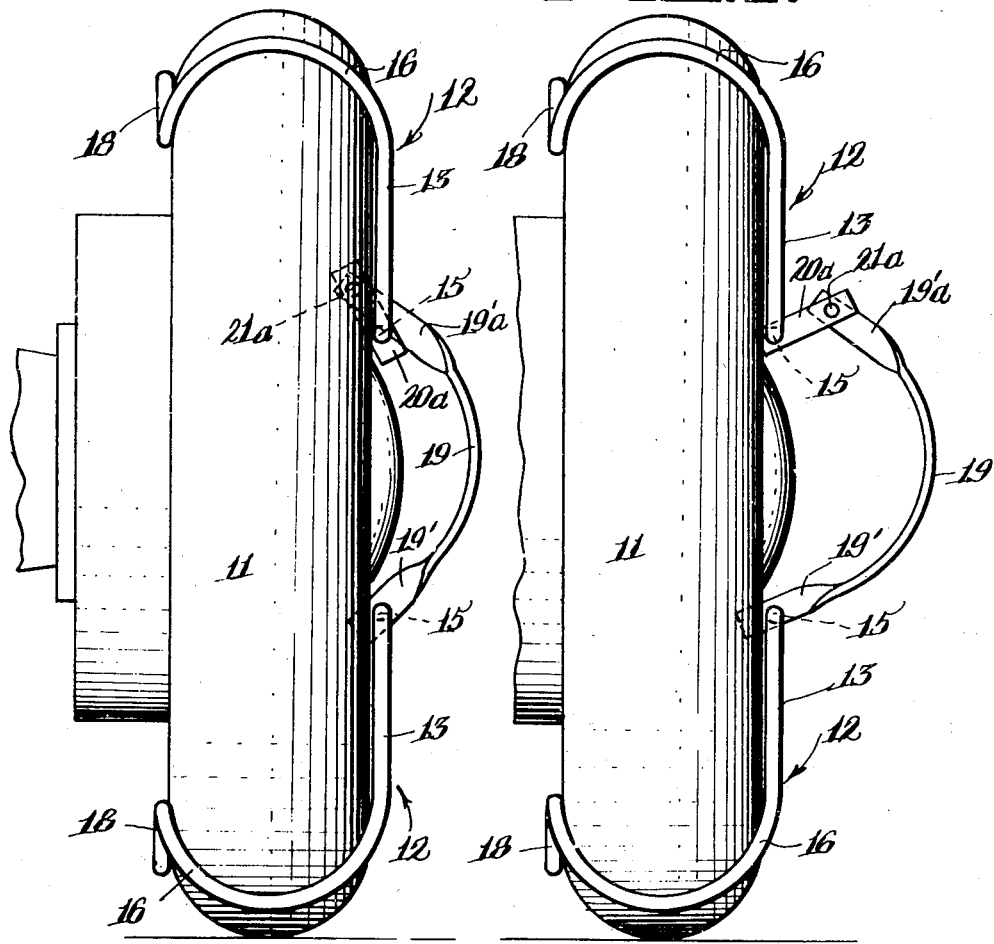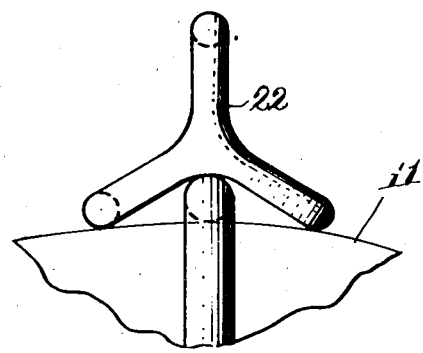
INVENTOR.
HERBERT B. HARROP

2,426,683

UNITED STATES PATENT OFFICE 2,426,683

TRACTION DEVICE FOR WHEELED VEHICLES

Herbert B. Harrop, Middlebush, N. J.

Application August 1, 1944, Serial No. 547,555

2 Claims. (Cl. 152—216)

This invention relates generally to a device and method for fixing equipment on the peripheries of rolling wheels to increase traction thereof when operated under power on soft or slippery surfaces. More particularly, the invention is concerned with a method and device for fixing cross-bars or other appropriate equipment on the tires of powered wheels to provide means for placing and removing said equipment with a minimum expenditure of time and effort.

The main object of the invention resides in the provision of a method and device for placing and removing cross-bars or similar equipment adapted to increase the traction of powered rolling wheels in mud, snow or on icy ground by simple and quick manual movements without the necessity of recourse to a jack for raising the wheels off the ground.

A further object of the invention resides in the utilization of a connecting member for the peripheral elements affording traction to rolling wheels whereby said elements are fixed in place by tension radially applied and whereby said elements are easily removable by relief of said tension.

These objects and other ends and advantages of the invention will hereinafter appear in the progress of the disclosure and as pointed out in the appended claims.

Accompanying this specification are drawings showing a preferred form of the invention wherein:

Figure 1 is a side view of the device showing a means and method of fixing traction equipment on the periphery of an automobile tire.

Figure 2 is a front view of Figure 1.

Figure 3 is a view similar to Figure 2 showing the position of the connecting member for the traction equipment for relief of tension on said equipment preparatory to removal.

Figure 4 is a sectional view of Figure 1 along the plane 4—4 thereof.

Figure 5 is a sectional view of Figure 1 along the plane 5—5 thereof.

Figure 6 is an enlarged view in elevation of a special tread associated with the traction element.

Conventional equipment for increasing traction is usually comprised of cross-chains held in position at regular intervals around the circumference of a wheel by means of two rail-chains, one on the outer side of the tire and the other on the inner side, each rail-chain being joined end-to-end by its respective lock. Such a unit remains in place by peripheral tension on the rail-chains as opposed to radial tension on the cross-chains and by reason of the smaller rail-chain periphery as compared to the periphery of the tire.

A tire chain unit is customarily installed by jacking up the wheel until all the points thereof on the circumference are free of the ground, but where the ground is smooth and hard, the chain may be installed by carefully extending it in flat condition in the line of motion and rolling the wheel into position. Similarly, the tire chain is removed either by freeing the wheel with a jack, rotating said wheel until the locks of the chain are within reach, unfastening the locks and then finally disentangling the chain from tire and axle. Under favorable conditions, the jacking up of the wheel may be omitted for removal of the tire chain but one must proceed with the remaining steps and then finally roll the wheel off the detached chain.

Other forms of equipment in use are individual cross-chains which are passed entirely around tire and rim, each fastened end-to-end with a snap; a combination of cross-chain and strap fastened with snap or buckle; and a cross-chain passed over the tread of the tire and engaged with fixed hooks riveted or welded to the rim. It is a common practice to use three or four individual cross-chains per wheel. The flexibility of cross-chains makes all of the prior described operations difficult, dirty and time-consuming.

According to the invention herein, the means and method of fixing appropriate equipment on powered rolling wheels overcome all the objections hereinbefore stated. In the preferred embodiment of the invention shown in the drawings, one of the two members constituting a wheel unit is shown. Each member is comprised of gripping members such as a pair of double hooks diametrically opposed and adapted to be engageable with the periphery of the wheel tire, the hooks being secured together by a connecting member having means operative thereon to exert radial tension whereby said hooks are secured in place to offer the traction facilities required at the periphery of the wheel, the said means also being operative to relieve said tension for purposes of easily removing the hooks from the periphery.

Thus, an automobile wheel 10 provided with a tire 11 is shown having a pair of similar double hooks each designated generally by numeral 12. Diverging arms 13 and 14 of the double hook are joined at the inner ends by a cross piece 15 while the said arms continue to form curved or hooked portions 16 and 17, to engage transversely the periphery of tire 11 as best shown in Figures 2 and 3. The ends of the hooked portion 16 and 17 are joined by a cross member 18 adapted to lie concentrically of and against the inner wall of tire 11.

The double hooks 12 are connected together by suitable means for purposes of applying and relieving radial tension thereon and therefrom such as by a double spring 19 preferably of flat steel, the said spring 19 at one end being joined as at 20, the cross piece 15 of one of the double hooks 12 penetrating the twisted side portions 19' of spring 19 forming a suitable joint therewith. The opposite ends of spring 19 are free as at 19'a and are adapted to cooperate with means operative thereon to induce and relieve tension on the double hooks. Said means consists of a yoke member having side walls 20a penetrated by cross pieces or ball 15 and a bottom piece 21, the terminals of side walls 20a and spring ends 19'a receiving a common bolt 21a. The hook members 12, spring 19 and the operative means or yoke therefor are so shaped and dimensioned that when the assembly is extended as shown in Figure 3 the double hooks may be loosely engaged at diametrically opposed positions on tire 11. When the assembly is contracted as shown in Figure 2 as by swinging the common joint of spring 19 and the operative means or yoke inwardly, the toggle effect sets up and maintains radial tension to lock the hook members 12 on the tire 11.

To mount the device with the wheel 10 standing on a hard surface, the first member comprised of a pair of double hooks connected together by spring 19 and the operative means or yoke associated therewith is snapped on as shown in the drawings in Figures 1 and 2. Thereafter a second member comprised of the same elements is snapped on at right angles thereby providing eight equi-distant points of contact with the road per revolution of the wheel. In deep mud or snow, the first member is placed horizontally, the wheel is then rotated under power a quarter of a revolution and then the second member is placed.

Normally the spring tension of spring 19 does not permit of creeping, that is, of a slow progress of the double hooks along the periphery of wheel 10. Creeping is desirable only when the equipment is used for considerable distances on a hard surface but is unjustified where the operations of mounting and dismounting of traction equipment are simple and quick. Where local conditions require traction in excess of that supplied by hook members comprised of such material as round steel, special treads as required may be fixed either permanently or removably. As shown in Figure 6 of the drawings an angle formation 22 is suitably secured to any tread portion such as 16 of the double hooks it being understood that the angle formation may also be removably secured.

Essentially the device is comprised of a plurality of tread members crossing the periphery of the tire 11 in a transverse direction and connected diametrically on the wheel in a manner to provide a substantial radial tension to hold them in place. In the embodiment shown double hooks are paired against each other and the radial tension is maintained by means of a spring 19 for setting up and maintaining or for relieving said tension.

Advantages offered by the invention herein are simplicity, cleanliness and speed. Each member as illustrated consists of four sufficiently rigid elements such as the double hooks 12, spring 19 and the operative means or yoke for the spring properly jointed to give sufficient flexibility thereby making the operation of handling definite, clean and quick as compared with the difficulties of handling a tire chain of numerous elements having almost complete flexibility. The tire chain requires the use of both hands under the most favorable conditions and four hands are not too many in bad weather or on a bad road. The device of the invention herein illustrated can be mounted or dismounted with one hand only and the degree of traction may easily be increased to suit excessively soft ground by arming the grip portions 16 or 17 as by member 22.

Where a car stands on a hard surface, the equipment can be mounted on one wheel in ten seconds; whereas in deep mud or snow mounting time is increased by the time required to rotate the wheel to the second position. For dismounting, where one or both members may be pinned down the time is increased by the time utilized for rolling the wheel free and amounts to less than five seconds plus the time required for such rolling.

I wish it understood that minor changes and variations in the material, location, integration and subcombination of parts of the device may be resorted to without departing from the spirit of the invention and the scope of the appended claims.

I claim:

1. In a traction device for removable application to the peripheries of rolling wheels, including a pair of diametrically opposite gripping members transversely disposed on the periphery of a rolling wheel, a springable frame disposed externally of the wheel and at one end being pivotally connected to one of the gripping members, and a link member connecting the opposite end of the frame to the other gripping member for setting up and relieving radial tension on said gripping members.

2. In a traction device for removable application to the peripheries of rolling wheels, including a pair of diametrically opposite gripping members transversely disposed at the periphery of a rolling wheel, a resilient member disposed externally of the wheel and at one end being pivotally connected to one of the gripping members, and a link member connecting the opposite end of the resilient member to the other gripping member to set up and relieve radial tension at said gripping members.

HERBERT B. HARROP.

REFERENCES CITED

The following references are of record in the file of this patent:

UNITED STATES PATENTS

| Number | Name | Date |
|---|---|---|
| 1,244,018 | Beranek | Oct. 23, 1917 |
| 1,101,198 | Lashar | June 23, 1914 |
| 2,315,838 | Bryon | Apr. 6, 1943 |
| 1,320,940 | Stephenson | Nov. 4, 1919 |
| 1,405,003 | Rightmire | Jan. 31, 1922 |
| 937,528 | Holan | Oct. 19, 1909 |
| 1,243,711 | Christy | Oct. 23, 1917 |
| 1,600,276 | Dumbowsky | Sept. 21, 1926 |
| 1,142,909 | Purdie | June 15, 1915 |
| 1,213,949 | Reger | Jan. 30, 1917 |